United States Patent [19]
Smith et al.

[11] Patent Number: 6,033,355
[45] Date of Patent: Mar. 7, 2000

[54] CENTRIFUGE WITH A PLURALITY OF INDIVIDUAL CENTRIFUGE DEVICES

[75] Inventors: Matthew Smith, Glasgow; Thomas Roberts, Bearsden, both of United Kingdom

[73] Assignee: Laboratory Automation Development and Services Ltd., Glasgow, United Kingdom

[21] Appl. No.: 09/068,425
[22] PCT Filed: Nov. 8, 1996
[86] PCT No.: PCT/GB96/02748
  § 371 Date: May 8, 1998
  § 102(e) Date: May 8, 1998
[87] PCT Pub. No.: WO97/18022
  PCT Pub. Date: May 22, 1997

[30] Foreign Application Priority Data

Nov. 11, 1995 [GB] United Kingdom .................. 9523141

[51] Int. Cl.[7] ........................................ B04B 5/02
[52] U.S. Cl. ................................. 494/33; 494/84
[58] Field of Search .................. 494/31, 33, 16, 494/84, 19; 422/72; 366/217

[56] References Cited

U.S. PATENT DOCUMENTS 3,838,809 10/1974 Williams .
4,233,532 11/1980 Esters .

FOREIGN PATENT DOCUMENTS

2204916 5/1974 France .
1337424 11/1973 United Kingdom .
1423987 2/1976 United Kingdom .

*Primary Examiner*—Charles E. Cooley
*Assistant Examiner*—Terry K. Cecil
*Attorney, Agent, or Firm*—Ratner & Prestia

[57] ABSTRACT

A centrifuge apparatus for use in the analysis of laboratory samples. The centrifuge apparatus includes a plurality of individual centrifuge devices and a robotic loading and/or unloading device. Each of the centrifuge devices may be loaded and unloaded without affecting the operation of the other centrifuge devices. The centrifuge devices include a plurality of rotors that are spaced apart and translated along a predetermined path. The rotors are rotatably mounted with respect to the predetermined path and the rotational planes of the rotors extend substantially at right angles to the predetermined path.

20 Claims, 11 Drawing Sheets

_FIG.13a_

_FIG.13b_

CENTRIFUGE WITH A PLURALITY OF INDIVIDUAL CENTRIFUGE DEVICES

FIELD OF THE INVENTION

The present invention relates, firstly, to improved centrifuge apparatus and, secondly, to improvements in or relating to electric motors (particularly but not exclusively brushless electric motors). In its preferred form said centrifuge apparatus is based on said improvements in or relating to electric motors.

Brushless motors are commonly available electric machines, utilising the forces generated by the interaction of electric and magnetic fields to generate rotational motion. In the standard design of brushless electric motors, a shaft bearing a plurality of permanent magnets (the rotor) rotates within a cylinder around which one or more coils are wound (the stator).

Centrifuge apparatus of the type commonly used in laboratories for multiple discrete samples generally comprises a rotor body mounted on a vertical spindle and having a plurality of sample holders spaced around or adjacent to its outer periphery. The rotor is driven by any suitable means such as an electric motor. The loading and unloading of samples requires the rotor to be stopped, interrupting the processing of all samples carried by the rotor.

SUMMARY OF THE INVENTION

In accordance with a first aspect of the invention, there is provided centrifuge apparatus, typically but not exclusively for use in the analysis of laboratory samples. As used herein, the word "sample" is employed to designate any discrete object which may be centrifuged using the invention.

In its broadest sense, the first aspect of the invention provides apparatus comprising a plurality of individual centrifuge devices, at least one centrifuge loading and/or unloading device and control means for controlling the operation of said devices such that samples may be loaded and unloaded to and from individual ones of said centrifuge devices without interrupting the operation of the remainder of said centrifuge devices.

Accordingly, the invention may be embodied by an array of individual centrifuges together with a robotic loading and/or unloading device which is adapted to access each of the centrifuges in the array. Alternatively, the centrifuge devices may be adapted to be moved relative to a loading/unloading station. Each of the centrifuges may suitably be adapted to process only a single sample at a time, and is preferably adapted to rotate said sample in a vertical plane of rotation about a horizontal axis of rotation. In any case, it is preferred that the centrifuge devices be mounted on a common chassis or in a common enclosure.

In a preferred embodiment, the apparatus comprises:
a plurality of sample holders spaced along a predetermined path;
means for translating said sample holders along said predetermined path;
said sample holders each being rotatably mounted with respect to said predetermined path for rotation about respective rotational axes in respective rotational planes; and
means for rotating said sample holders about their respective rotational axes.

Preferably, said predetermined path defines a closed loop.

Preferably also, said rotational planes of said sample holders extend substantially at right angles to said predetermined path.

Preferably, said predetermined path includes at least one sample loading and unloading station at which samples may be loaded and unloaded to and from sample holders as they pass said station.

Preferably, said predetermined path comprises a circular path and said sample holders are spaced around said path in fixed angular relationship to one another.

Preferably also, said respective rotational axes extend tangentially to said circular path.

Preferably also, said means for translating said sample holders around the closed loop defined by said circular path comprises means for rotating said sample holders together about a central, common axis extending perpendicularly to the plane of said circular path. Preferably also, said sample holders are mounted to a common, central hub. Most preferably, said sample holders are mounted at the ends of respective arms extending radially outwards from said hub, for rotation relative to said arms about said respective, tangential axes. Alternatively, said sample holders are mounted to a peripheral structure extending around the outside of said circular path, said peripheral structure being mounted to a support structure for rotation about said central axis.

In the particularly preferred embodiment of the first aspect of the invention, the centrifuge apparatus comprises a multi-segment electric motor in accordance with the second aspect of the invention (as defined below), each of said sample holders being associated with one of the rotors thereof.

In accordance with a second aspect of the present invention, there is provided a multi-segment electric motor comprising a plurality of rotors and a corresponding plurality of stators arranged in a series along a predetermined path, said rotors being independently rotatable about said path.

Preferably, each of said stators is adapted to be energised and/or controlled independently of the others.

In one embodiment, said predetermined path is linear. In other embodiments, said predetermined path is non-linear.

In the particularly preferred embodiment, said predetermined path defines a closed loop, and is preferably circular. In this case, the stators and rotors are preferably mounted with their axes of rotation lying tangential to said circular path.

Each rotor/stator constitutes an electric motor which is preferably of the DC brushless type, but which may alternatively be of any other type including, but not restricted to, AC synchronous, induction or variable reluctance types.

The rotors may be of any configuration, including but not restricted to the salient-pole or cylindrical type.

Preferably, the rotors are of the permanent magnet type, but might alternatively employ energised coils and sliprings.

The motors might alternatively be of the conventional DC type, having an armature wound about the rotor and energised through brushes, and having a permanently energised stator coil.

The rotors may be mounted for rotation about a single common shaft, defining said predetermined path.

Preferably also, said rotors are movable along said predetermined path relative to said stators. Provision may be made to allow access to said rotors at one or more locations along said predetermined path. Where the path is circular, the rotors are preferably movable together along said path about a common, central axis. Access to said rotors may be provided by means of a gap in the series of stators or by a gap formed in one or more of the stators.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1A:
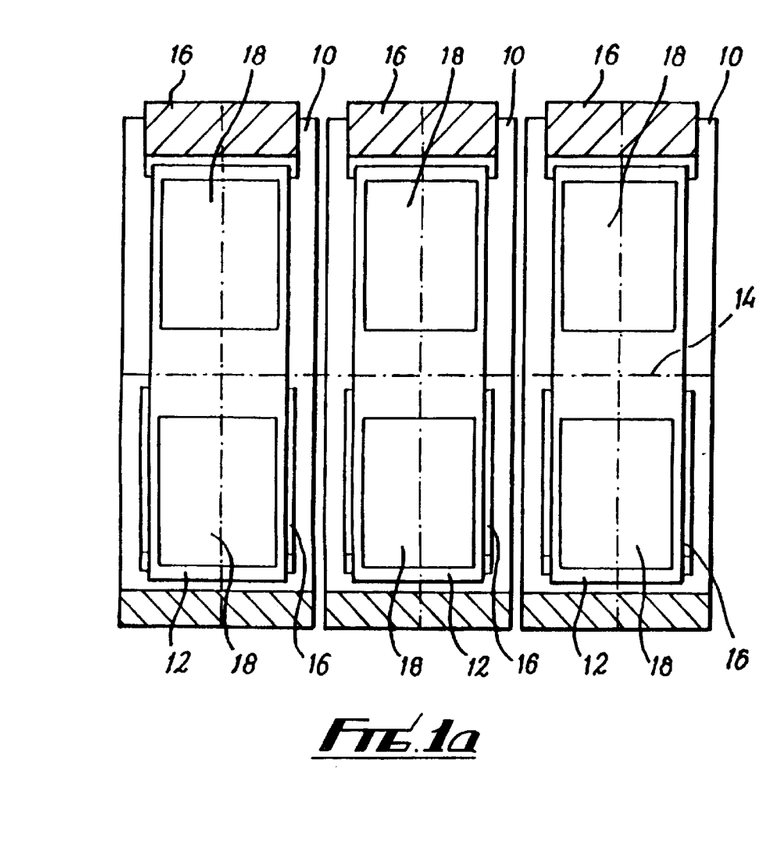
FIGS. 1(a) and 1(b) are, respectively, schematic, sectional side and end views of part of a first embodiment of a multi-segment electric motor in accordance with the second aspect of the invention.
Figure 1B:
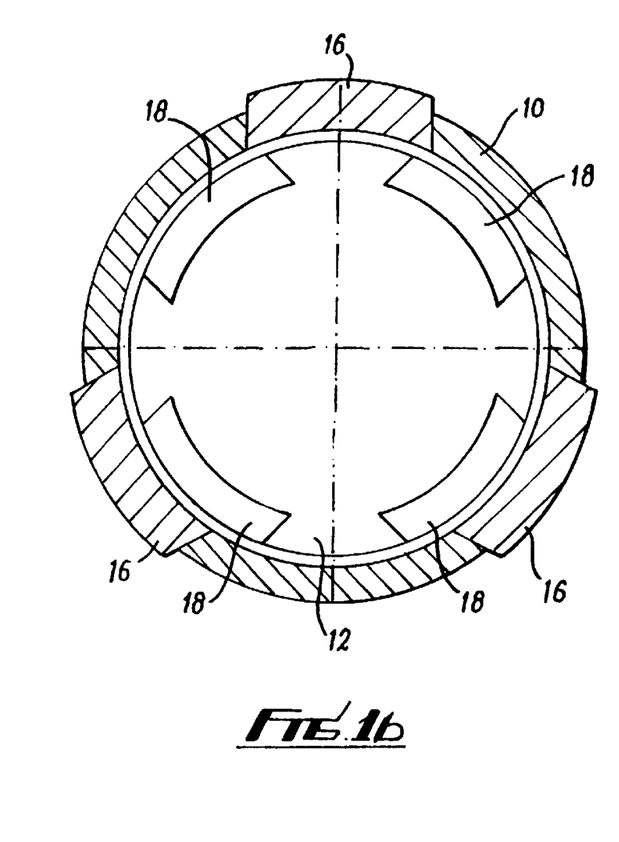

Referring now to the drawings, FIGS. 1(a) and 1(b) show a first embodiment of a multi-segment electric motor in accordance with the second aspect of the invention, comprising a plurality of generally cylindrical stator assemblies 10 and a corresponding plurality of generally cylindrical rotor assemblies 12 arranged in a series along a predetermined, linear path 14.

In this example, each of the stator/rotor combinations is configured as a brushless DC machine. Each of the stators includes a plurality of stator coils 16 and each of the rotors 12 includes a plurality of permanent magnets 18. It will be appreciated that the stator/rotor combinations could equally be configured as any other type of electrical rotary machine, including conventional DC machines, AC synchronous or induction machines, variable reluctance machines or stepper-type motors.

The rotors 12 are rotatable about a common axis of rotation corresponding to the linear path 14. The rotors 12 are rotatable about their common axis independently of one another, and may be mounted on a common shaft (not shown) extending along the path 14. The stators 10 are controlled and/or energised independently of one another by any suitable means (not shown), analogous to those of conventional electrical machines. Such energisation and control means are well known in the art and are not described herein. The design of the stators and rotors might also be varied as in conventional machines. For example, the rotors might be of the salient pole or cylindrical type.

Figure 2A:
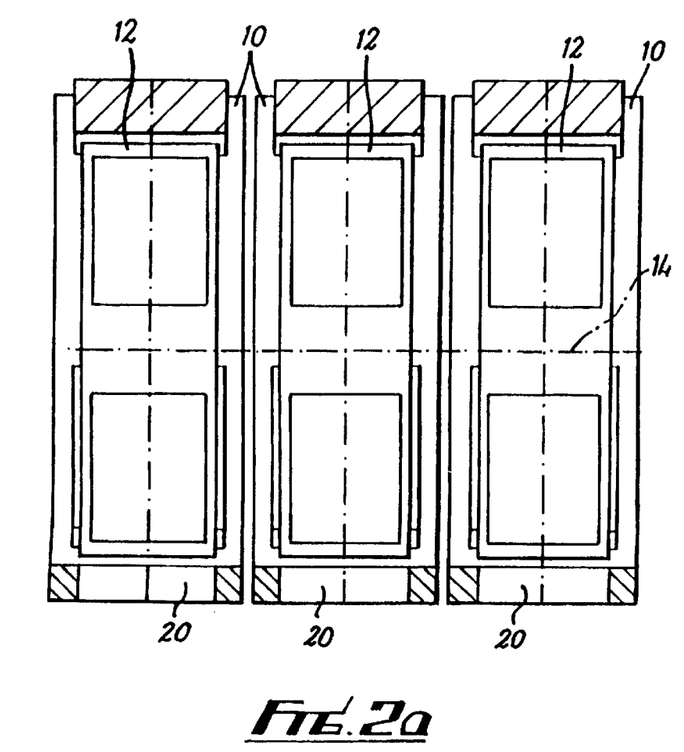
FIGS. 2(a) and 2(b) are, respectively, schematic, sectional side and end views of part of a second embodiment of a multi-segment electric motor in accordance with the second aspect of the invention.
Figure 2B:
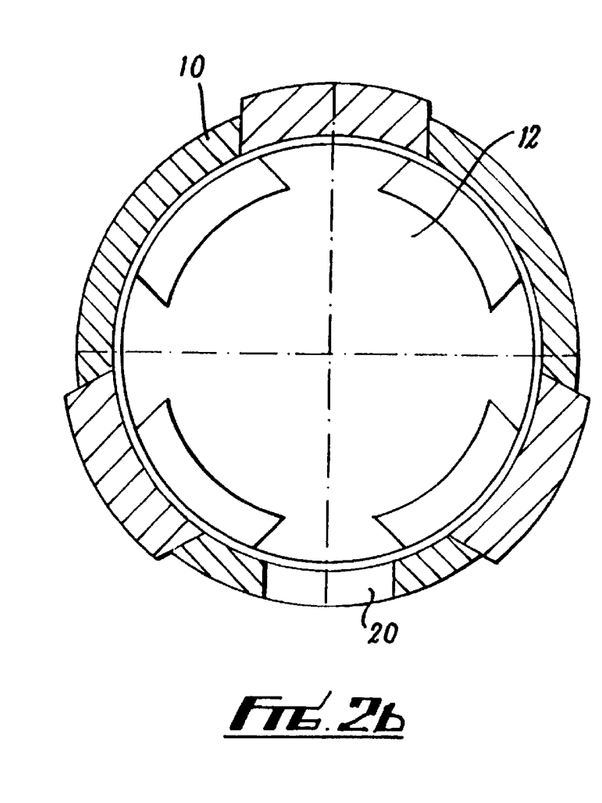

FIGS. 2(a) and 2(b) show a multi-segment electric motor which is essentially identical to that of FIGS. 1(a) and 1(b) except that each cylindrical stator body 10 includes an access slot 20, allowing access through the stator body to the rotor 12 enclosed therein.

In accordance with another aspect of the invention, the rotors 12 may be arranged to be movable along the path 14, relative to the stators 10, allowing different rotors 12 to be aligned with different stators 10. In this case it would not be necessary for every stator 10 to include an access slot in order to permit access to each of the rotors 12, since the rotors could be translated along the path 14 to align any particular rotor 12 with a stator having an access slot. Alternatively, the series of stators might simply include one or more gaps with which rotors could be aligned to permit access thereto.

Figure 3A:
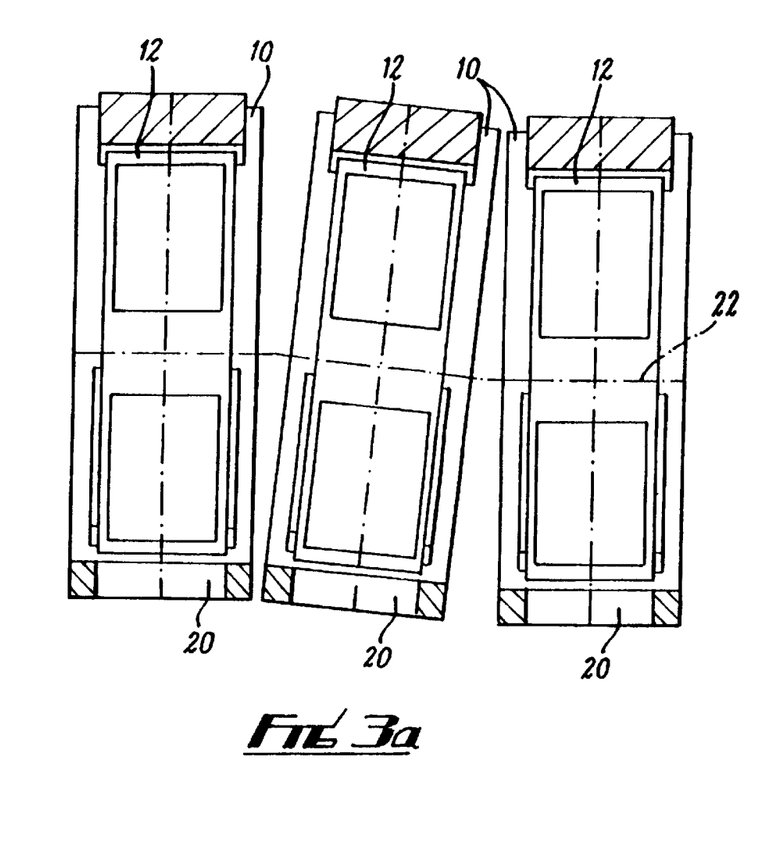
FIGS. 3(a) and 3(b) are, respectively, schematic, sectional side and end views of part of a third embodiment of a multi-segment electric motor in accordance with the second aspect of the invention.
Figure 3B:
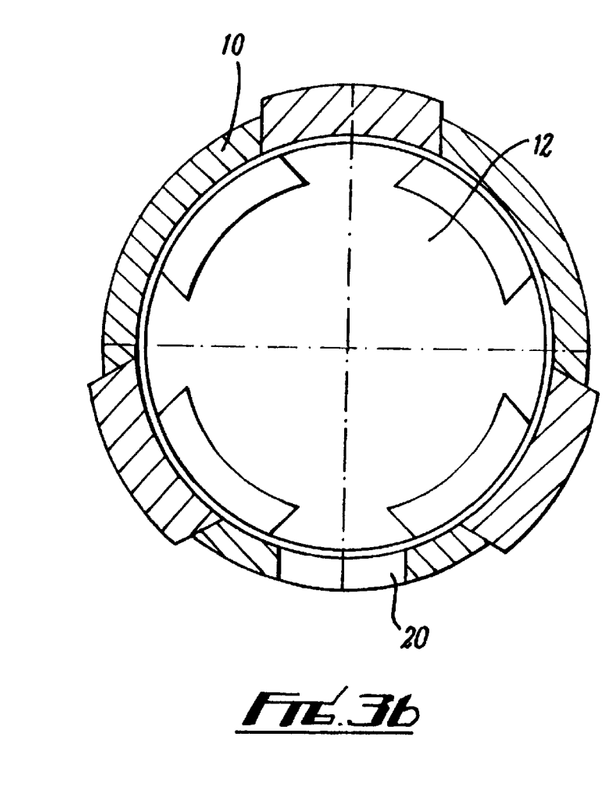

FIGS. 3(a) and 3(b) show a further embodiment of a multi-segment electric motor which is essentially identical to that of FIGS. 2(a) and 2(b) except that the path 22 along which the stators 10 and rotors 12 are arranged is non-linear. The illustrated example shows access slots as in FIGS. 2(a) and 2(b). Such arrangements for permitting access to the rotors 12 in this case might vary in the same way as described above.

Where the path along which the stators and rotors are arranged is non-linear, the rotational axes of the rotors may or may not coincide with the path, depending upon the shape of the path. On linear portions of the path the rotational axis will generally coincide with the path; on curved portions the rotational axis will generally be tangential to the path. In either case, each rotor will rotate about its rotational axis in a rotational plane which is essentially perpendicular to the path at that point.

Figure 4:
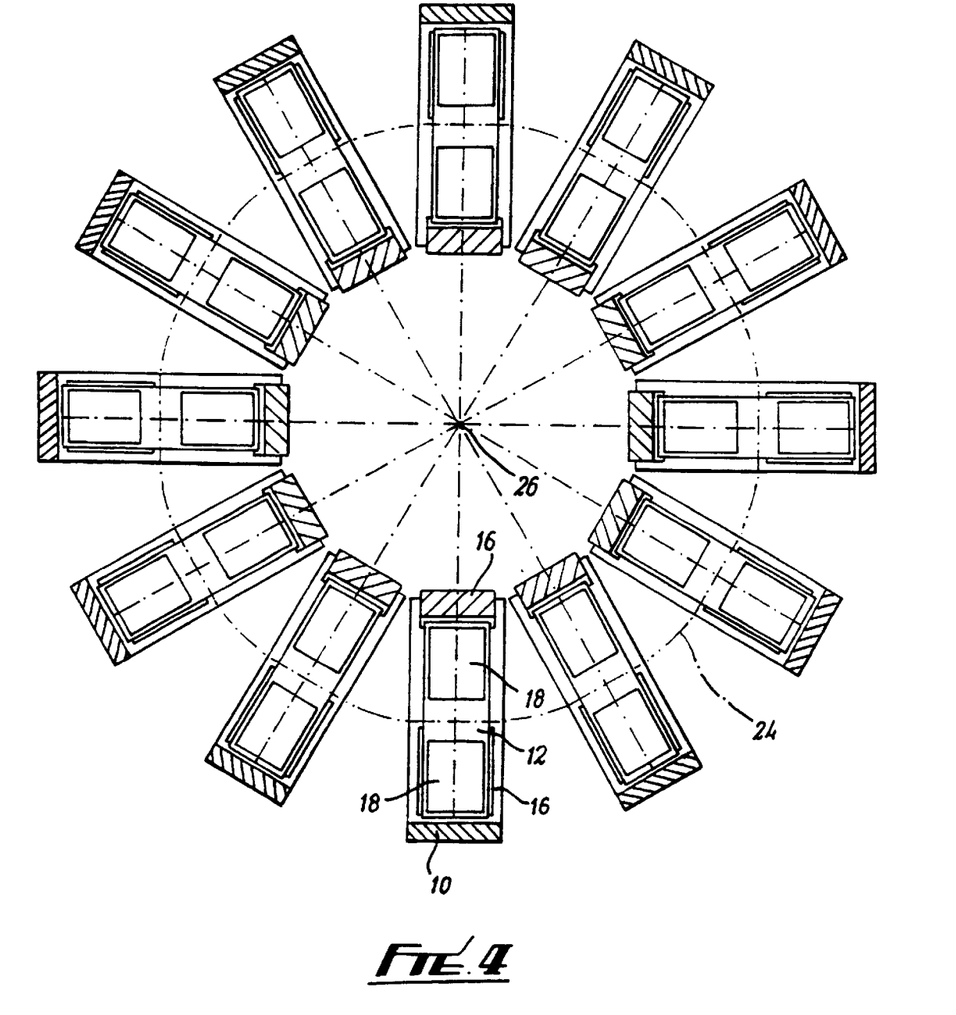
FIG. 4 is a schematic, sectional plan view of a first fourth embodiment of a multi-segment electric motor in accordance with the second aspect of the invention.

FIG. 4 illustrates a preferred embodiment of a multi-segment electric motor, in which the stators 10 and rotors 12 are located around a circular path 24. The individual stators 10 and rotors 12 are essentially identical to those of previous embodiments, and may include access slots or other rotor access means as previously described. The individual stators 10 and rotors 12 are spaced substantially equiangularly around the circular path 24 in fixed angular relationship to one another. The rotational axes of the rotors 12 are tangential to the circular path 24. The general arrangement of the stators and rotors may be described as "toroidal" for convenience.

The circular path along which the stators and rotors are arranged defines a closed loop. Where the rotors 12 are arranged to be translatable around the circular path 24, this allows any individual rotor 12 to be aligned with an access location (that is, for example, a stator having an access slot or a gap in the series of stators), while the other rotors 12 remain aligned with respective stators 10. This may also be achieved using closed loop paths which are non-circular. In the present example, translation of the rotors around the circular path 24 amounts to rotation of the rotors about a common, central axis 26 extending at right angles to the plane of the path 24.

Figure 5:
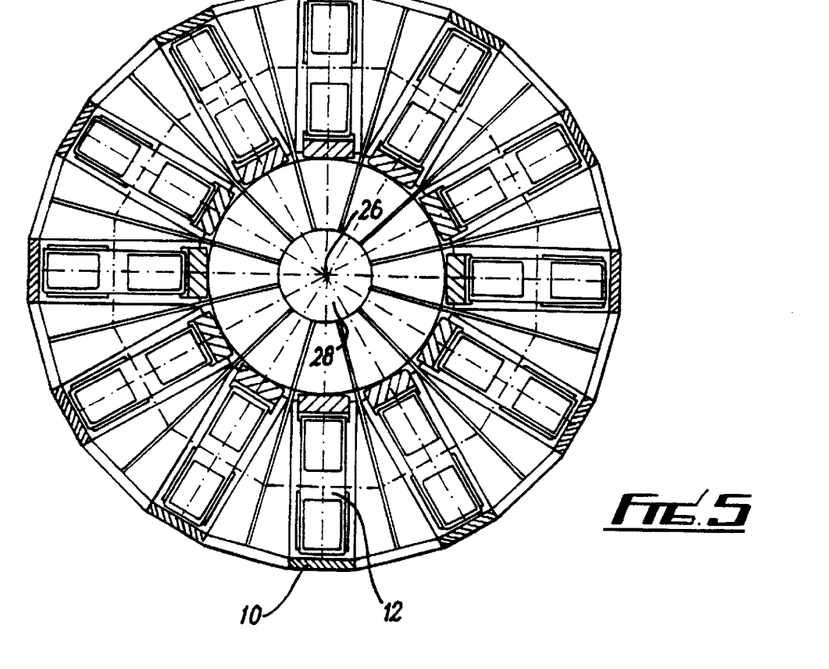
FIG. 5 is a schematic, sectional plan view of a further developed example of the fourth embodiment of a multi-segment electric motor in accordance with the second aspect of the invention.

FIG. 5 shows a further developed example of a toroidal machine as shown in FIG. 4, in which the rotors 12 are all mounted to a common, central hub 28 for rotation about the central axis 26 relative to the stators.

The toroidal multi-segment electric motors described above find particular application in centrifuge apparatus in accordance with the first aspect of the invention. Each rotor 12 may be adapted to incorporate or support one or more objects, samples or sample holders, to be centrifuged by rotation of the rotor about its rotational axis. The rotors may be rotated about their common, central axis 26 whilst the individual rotors 12 rotate about their individual rotational axes. This allows individual rotors to be presented to access locations for the loading or unloading of objects or samples, whilst the other rotors continue to rotate about their rotational axes. The continuous mode of operation provided by such apparatus is advantageous in comparison with conventional centrifuges, in which all objects or samples are mounted on a single centrifuge rotor, so that the entire rotor has to be stopped in order to allow the loading and unloading of individual objects or samples.

Figure 6:
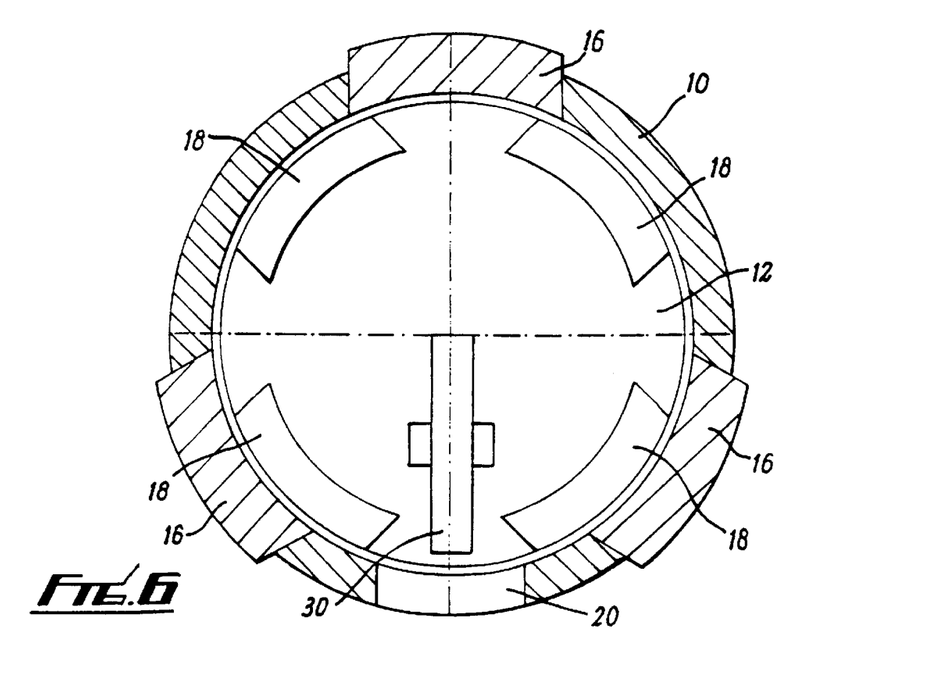
FIG. 6 is a schematic, sectional end view of part of the embodiment of FIG. 4 or FIG. 5, illustrating the adaptation of the multi-segment electric motor for use as a centrifuge in accordance with the first aspect of the invention.

FIG. 6 shows an example of stator/rotor combination in which the rotor 12 is provided with a slot, recess or the like 30, adapted to hold an object, sample or sample holder. The sample slot 30 may be aligned with an access slot 20 in the stator body 10 for loading and unloading.

Figure 7:
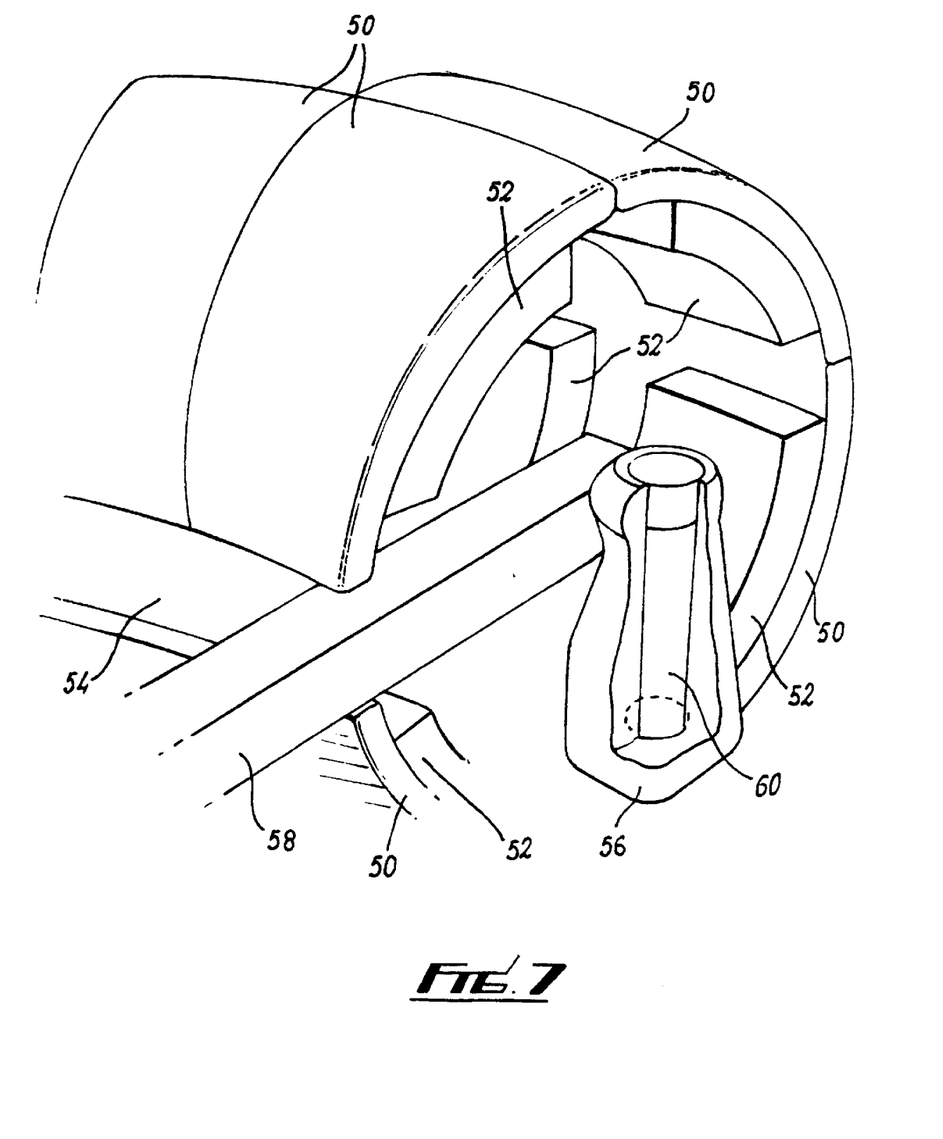
FIG. 7 is a schematic, fragmentary, perspective view of a further example of a multi-segment electric motor adapted for use as a centrifuge in accordance with the first aspect of the invention.

FIG. 7 illustrates a further example of a toroidal, multi-segment centrifuge apparatus in accordance with the second aspect of the invention. A stator torus comprises a plurality of stator segments 50 having stator windings 52 formed thereon. The stator segments 50 together make up the series of stators spaced around the length of the torus, and are arranged such that a continuous slot 54 is formed around the inner circumference of the torus allowing access to the interior of the torus.

Each rotor 56 is mounted on the end of a support arm 58 which extends from a central hub (not shown), through the slot 54 into the interior of the torus. The rotor 56 is mounted for rotation relative to the support arm 58 about its rotational axis, which extends tangentially to the circular path extending around the interior axis of the torus. Rotation of the central hub thus causes the rotors to be translated along the circular path for presentation to a loading/unloading station (as previously described, not shown in FIG. 7) as required.

In this example, the rotor 56 is itself configured as a holder for a sample container 60 in the form of a test tube or the like. It will be appreciated that the configuration of the rotor and the sample holding arrangement provided thereby may be varied widely according to need.

FIGS. 8 to 12 show a further embodiment of a multi-segment motor adapted for use as a centrifuge apparatus.

Figure 8:
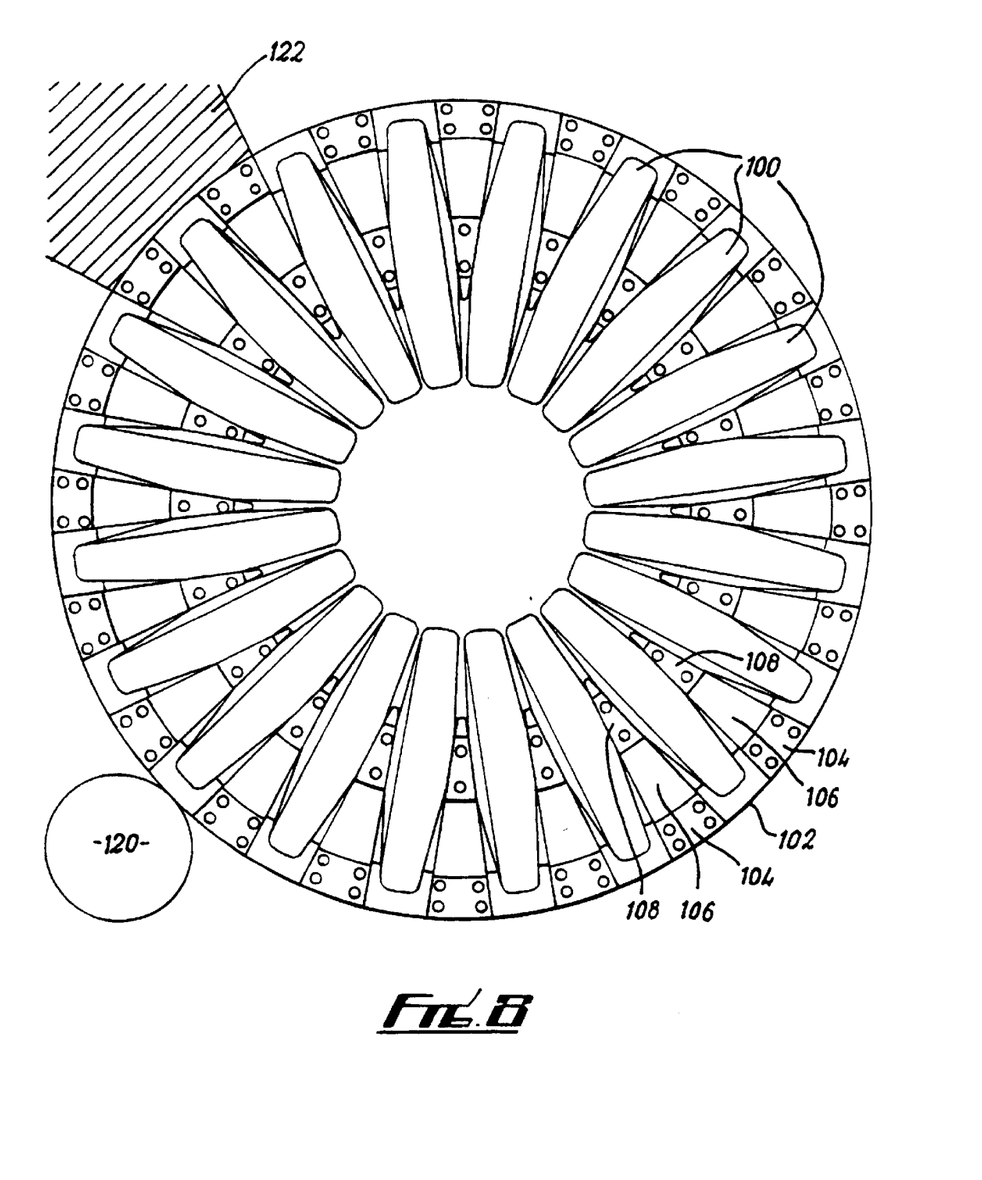
FIG. 8 is a schematic plan view illustrating a further example of a multi-segment electric motor adapted for use as a centrifuge in accordance with the first aspect of the invention.
Figure 9:
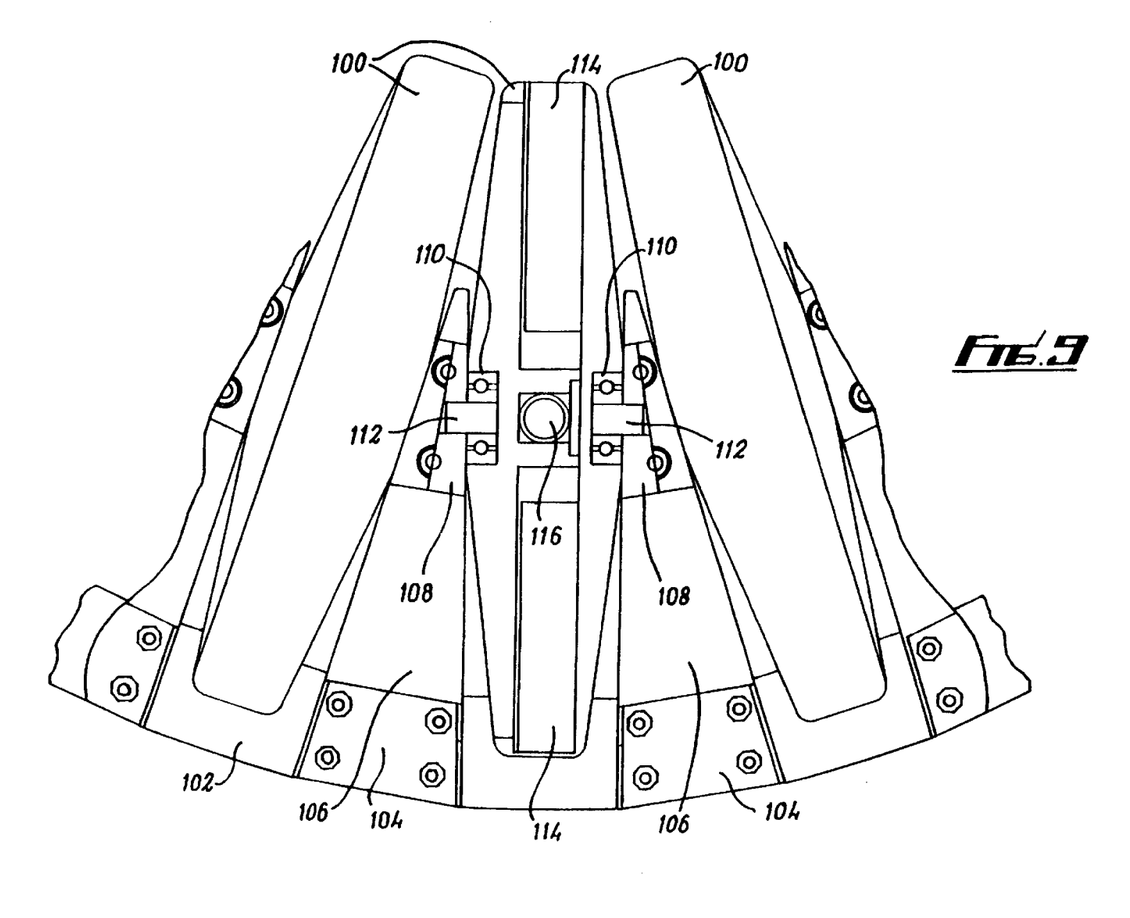
FIG. 9 is an enlarged, fragmentary plan view, partly in section, of a portion of the centrifuge apparatus of FIG. 8.
Figure 10:
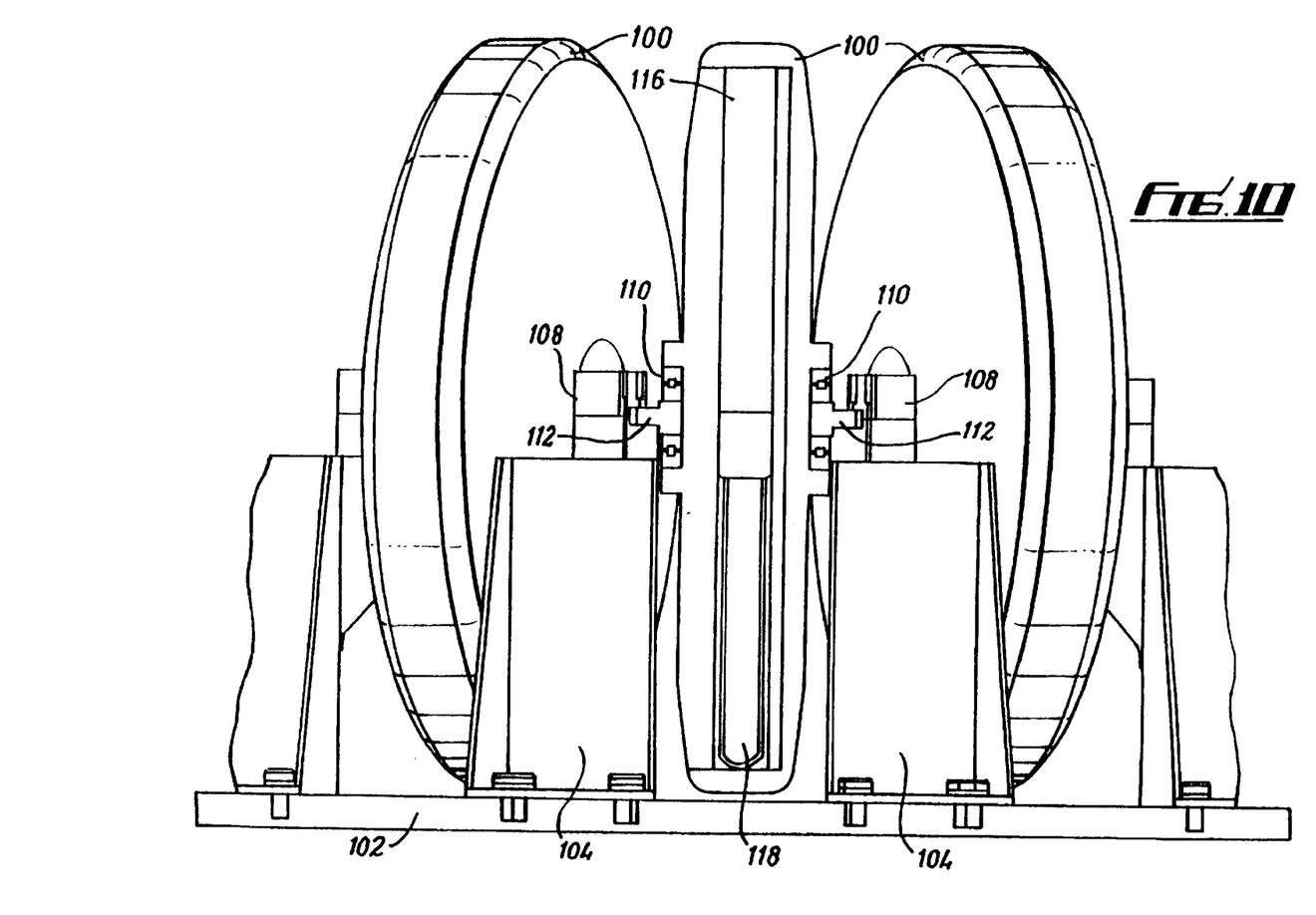
FIG. 10 is an enlarged, fragmentary side view, partly in section, of the portion of the centrifuge apparatus of FIG. 8 as shown in FIG. 9.

FIGS. 8 to 10 illustrate the arrangement of the rotors/sample holders 100, which are again disposed around a circular path. In this case the rotors 100 are supported by a peripheral structure extending around the outside of the circular path.

The peripheral structure comprises an annular ring member 102 positioned above or below the centres of rotation of the rotors 100, preferably (but not necessarily) by a distance slightly greater than the rotor radius. A plurality of vertically extending brackets 104 are secured to one surface of the annular ring 100, and a corresponding plurality of generally triangular arms 106 are secured to and extend inwardly from the brackets 104, such that a parallel-sided gap is defined between each pair of adjacent arms 106. A vertically extending bearing assembly 108 is secured to each of the arms 106 adjacent the innermost end thereof.

Each of the rotor bodies 100 is rotatably mounted in one of the gaps between adjacent arms 106, supported between the bearing assemblies 108 thereof. As is best seen in FIGS. 9 and 10, each of the rotor bodies 100 itself includes a pair of bearings 110, the rotor body being rotatably supported by a pair of pins 112 engaging the rotor bearings 110 and the bearing assemblies 108 of the peripheral structure. The rotor bodies 100 each encapsulate a plurality of permanent magnets 114 and include means for receiving an object or sample to be centrifuged, such as a cylindrical bore 116 for receiving a sample tube 118 (FIG. 10).

The peripheral structure is mounted on a suitable support structure (not shown) for rotation relative thereto about the centre of the circular path, such as by means of a peripheral friction drive schematically indicated by reference numeral 120 in FIG. 8, in which a sample loading/unloading location is also indicated by shaded area 122.

Figure 11:
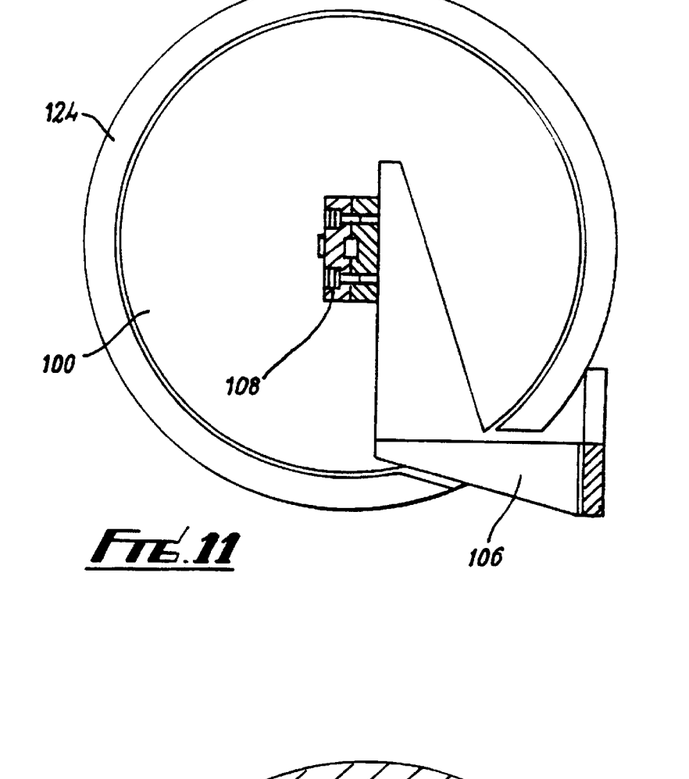
FIG. 11 is an end view of one of a plurality of stator/rotor combinations of the centrifuge apparatus of FIGS. 8 to 10.
Figure 12:
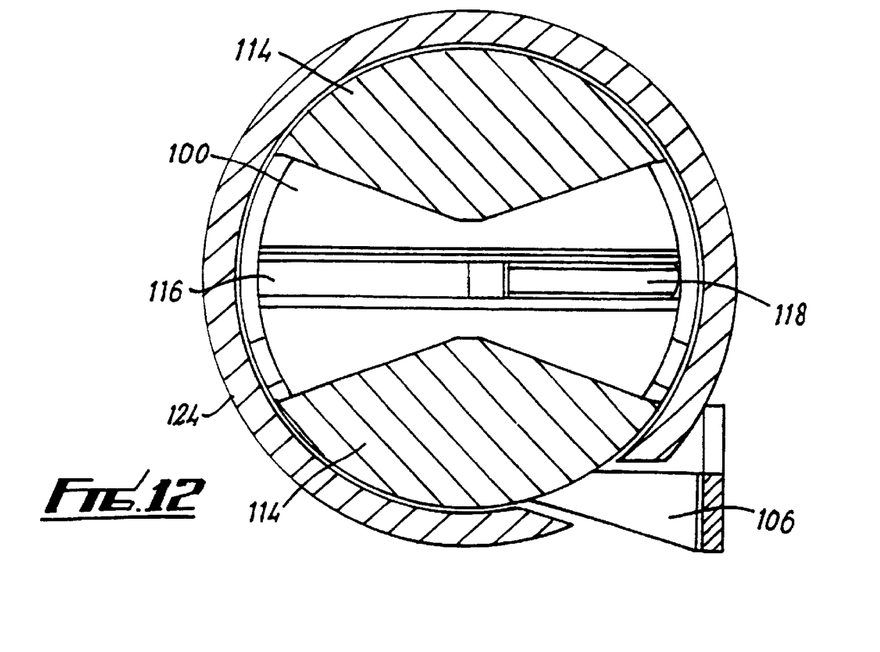
FIG. 12 is a sectional side view of the stator/rotor combination of FIG. 11.

The arrangement of the stator is illustrated in FIGS. 11 and 12. The stator 124 may have a generally toroidal configuration constructed in a manner similar to that shown in FIG. 7, having a continuous slot around its circumference allowing the arms 106 of the peripheral structure to extend into the interior of the stator 124 to support the rotor bodies 100 therein. A gap would be formed in the stator torus at the loading/unloading location 122 of FIG. 8.

Whilst the centrifuge apparatus in accordance with the invention is preferably configured such that the rotors are translated around a closed-loop path, and most preferably a circular path, the path need not be a closed loop. The apparatus might alternatively be configured such that the rotors are translated from a first end to a second end of a linear or non-linear path, with transport means being provided to return each rotor to the first end as it arrives at the second end.

Also, whilst it is preferred that the centrifuge apparatus is implemented using a multi-segment motor arrangement as described herein, it might alternatively be implemented by using a plurality of individual centrifuge devices arranged for translation along the required path past a loading/unloading station. In either case, the planes of rotation of the motors need not necessarily be disposed at right angles to the path, but might alternatively be at some other angle or parallel to the path (in the case of a closed-loop path, to the plane of the path). The invention might also be implemented by means of a plurality of centrifuge devices and a robotic loading/unloading device which moves relative to the centrifuge devices.

Figure 13A:
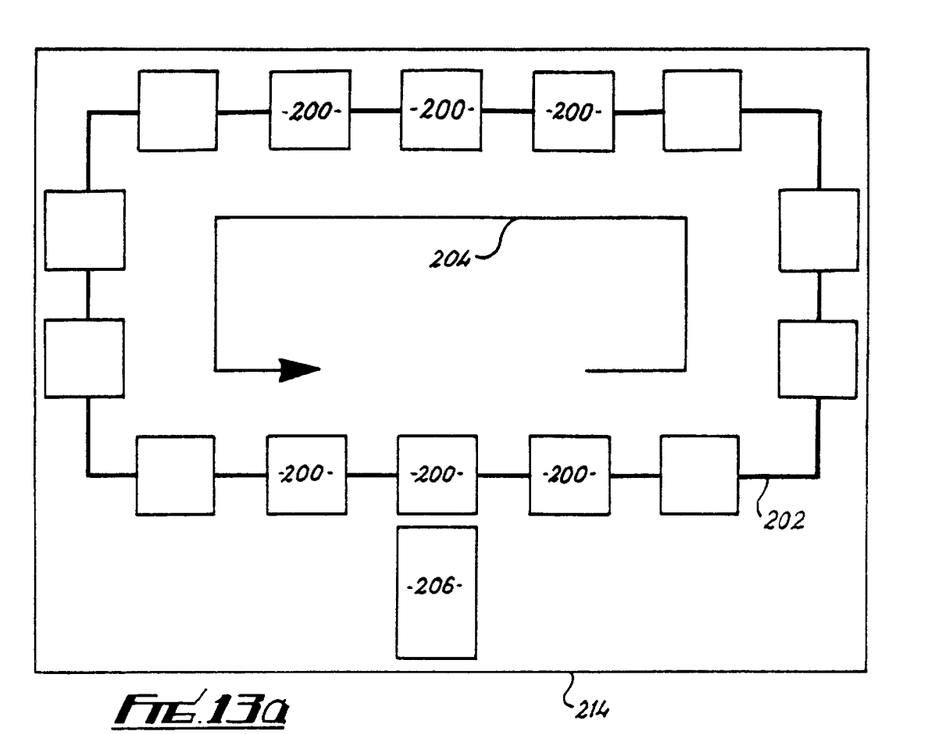
FIGS. 13(a) and 13(b) are schematic block diagrams illustrating examples of generalised centrifuge apparatus in accordance with the first aspect of the invention.
Figure 13B:
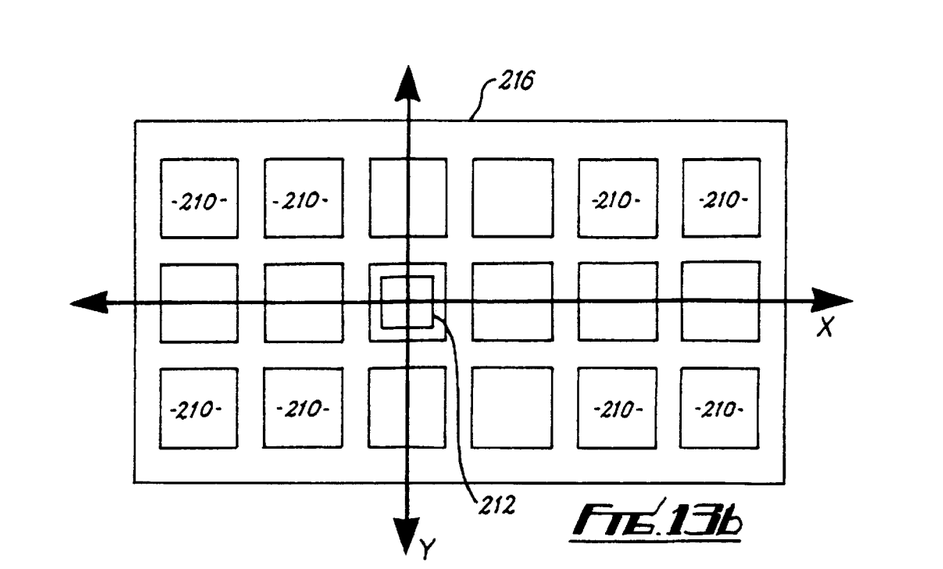

Examples of these generalised embodiments of the invention are illustrated in FIGS. 13(a) and 13(b). FIG. 13(a) shows a plurality of centrifuge devices 200 arranged along a closed-loop path 202, for translation along the path in the direction of the arrow 204 past a loading/unloading station 206. FIG. 13(b) shows an array of centrifuge devices 210, which are fixed in location and which are loaded and unloaded by means of a robotic device 212 adapted for translational movement in the X-Y plane relative to the centrifuge devices 210, as indicated by the arrows X and Y.

For the purposes of the present invention, a "centrifuge device" comprises a rotor body adapted for rotation about a rotational axis and adapted to hold at least one sample for the purpose of centrifuging the sample. It is also preferred that the centrifuge devices are all mounted on a common chassis or in a common enclosure, as in the examples of FIGS. 5 to 12 or as indicated schematically by boxes 214 and 216 in FIGS. 13(a) and 13(b).

In all cases of the first aspect of the invention, it is preferred that each centrifuge device is configured for rotation in a vertical plane about a horizontal axis of rotation and that each centrifuge device is adapted to hold a single sample. It will be understood that any one of a variety of schemes might be used to control the operation of the centrifuge devices and any associated load/unload devices. The various possibilities will be apparent to those skilled in the art and are not described in detail herein.

The multi-segment electric motor in accordance with the second aspect of the invention might also be used in other applications, such as multi-disk disk drives for data-carrying disks such as magnetic or optical disks.

Improvements and modifications may be incorporated without departing from the scope of the invention.

We claim:

1. Centrifuge apparatus comprising a plurality of individual centrifuge devices, at least one centrifuge loading and/or unloading device and control means for controlling the operation of said devices such that samples may be loaded and unloaded to and from individual ones of said centrifuge devices without interrupting the operation of the remainder of said centrifuge devices; wherein said apparatus comprises:

a plurality of sample holders spaced along a predetermined path;

means for translating said sample holders along said predetermined path;

said sample holders each being rotatably mounted with respect to said predetermined path for rotation about respective rotational axes in respective rotational planes; and means for rotating said sample holders about their respective rotational axes; and wherein:

said rotational planes of said sample holders extend substantially at right angles to said predetermined path.

2. Centrifuge apparatus as claimed in claim 1, comprising an array of individual centrifuge devices together with a robotic loading and/or unloading device which is adapted to access each of the centrifuges in the array.

3. Centrifuge apparatus as claimed in claim 1, wherein said centrifuge devices are adapted to be moved relative to a loading/unloading station.

4. Centrifuge apparatus as claimed in claim 1, wherein each of said centrifuge devices is adapted to process only a single sample at a time.

5. Centrifuge apparatus as claimed in claim 1, wherein each of said centrifuge devices is adapted to rotate said sample in a vertical plane of rotation about a horizontal axis of rotation.

6. Centrifuge apparatus as claimed in claim 1, wherein said centrifuge devices are mounted on a common chassis or in a common enclosure.

7. Apparatus as claimed in claim 1, wherein said predetermined path defines a closed loop.

8. Apparatus as claimed in claim 1, wherein said predetermined path includes at least one sample loading and unloading station at which samples may be loaded and unloaded to and from sample holders as they pass said station.

9. Apparatus as claimed in any claim 1, wherein said predetermined path comprises a circular path and said sample holders are spaced around said path in fixed angular relationship to one another.

10. Apparatus as claimed in claim 9, wherein said respective rotational axes extend tangentially to said circular path.

11. Apparatus as claimed in claim 9, wherein said means for translating said sample holders around the closed loop defined by said circular path comprises means for rotating said sample holders together about a central, common axis extending perpendicularly to the plane of said circular path.

12. Apparatus as claimed in claim 11, wherein said sample holders are mounted to a common, central hub.

13. Apparatus as claimed in claim 12, wherein said sample holders are mounted at the ends of respective arms extending radially outwards from said hub, for rotation relative to said arms about said respective, tangential axes.

14. Apparatus as claimed in claim 12, wherein said sample holders are mounted to a peripheral structure extending around the outside of said circular path, said peripheral structure being mounted to a support structure for rotation about said central axis.

15. Apparatus as claimed in claim 1, wherein each of said sample holders is incorporated in a rotor, each of said rotors being adapted to be driven electromagnetically by a corresponding stator, said stators being arranged in a series along said predetermined path, and said rotors being independently rotatable about said path.

16. Apparatus as claimed in claim 15, wherein each of said stators is adapted to be energised and/or controlled independently of the others.

17. Apparatus as claimed in claim 15, wherein the rotors are mounted for rotation about a single common shaft, defining said predetermined path.

18. Apparatus as claimed in claim 15, wherein said rotors are movable along said predetermined path relative to said stators.

19. Apparatus as claimed in claim 15, including means for enabling access to said rotors at one or more locations along said predetermined path.

20. Apparatus as claimed in claim 15, wherein access to said rotors is enabled by means of a gap in the series of stators or by a gap formed in one or more of the stators.

* * * * *